United States Patent
Kemshall (10) Patent No.: US 9,363,077 B2
(45) Date of Patent: Jun. 7, 2016

(54) TIME-BASED AUTHENTICATION

(71) Applicant: SecurEnvoy Plc, Theale, Reading (GB)

(72) Inventor: Andrew Christopher Kemshall, Basingstoke (GB)

(73) Assignee: SecurEnvoy Plc, Reading (GB)

( * ) Notice: Subject to any disclaimer, the term of this patent is extended or adjusted under 35 U.S.C. 154(b) by 162 days.

(21) Appl. No.: 14/140,617

(22) Filed: Dec. 26, 2013

(65) Prior Publication Data
US 2014/0189831 A1 Jul. 3, 2014

(30) Foreign Application Priority Data
Dec. 28, 2012 (GB) .................................. 1223466.2

(51) Int. Cl.
| | |
|---|---|
| *H01L 29/06* | (2006.01) |
| *H04L 9/08* | (2006.01) |
| *H04M 3/22* | (2006.01) |
| *H04L 9/32* | (2006.01) |
| *H04L 29/06* | (2006.01) |

(52) U.S. Cl.
CPC .............. *H04L 9/0861* (2013.01); *H04L 9/088* (2013.01); *H04L 9/3228* (2013.01); *H04L 9/3234* (2013.01); *H04L 63/0838* (2013.01); *H04L 63/0846* (2013.01); *H04L 63/0853* (2013.01); *H04M 3/22* (2013.01)

(58) Field of Classification Search
CPC ..... H04L 9/0861; H04L 9/088; H04L 9/0891; H04M 3/22
See application file for complete search history.

(56) References Cited

U.S. PATENT DOCUMENTS

| | | | | |
|---|---|---|---|---|
| 4,885,778 | A * | 12/1989 | Weiss ...................... | G06F 7/582 235/382 |
| 6,845,453 | B2 * | 1/2005 | Scheidt ................... | G06F 21/31 705/50 |
| 8,458,484 | B2 * | 6/2013 | Burke ...................... | G06F 21/31 713/166 |
| 8,627,424 | B1 * | 1/2014 | O'Malley .............. | G02F 21/335 370/254 |
| 8,756,666 | B1 * | 6/2014 | Silva ....................... | G06F 21/34 713/172 |
| 2002/0045443 | A1 * | 4/2002 | Hunzinger ............. | H04W 16/06 455/421 |
| 2003/0012312 | A1 * | 1/2003 | Gerhards ............. | H04B 1/7077 375/343 |

(Continued)

FOREIGN PATENT DOCUMENTS

WO 2012014231 A1 2/2012

OTHER PUBLICATIONS

Dr. Mark Lewney; Search Report under Section 17; Application No. GB1223466.2; Apr. 24, 2013; Intellectual Property Office; Newport, South Wales.

(Continued)

*Primary Examiner* — Hadi Armouche
*Assistant Examiner* — Sher A Khan
(74) *Attorney, Agent, or Firm* — Stevens & Showalter LLP (57) ABSTRACT

Time-based authentication apparatus deploys a seed record to user equipment such as a mobile telephone pre-equipped with an app. When a user initiates login access to a protected product or service, using a computing device, they run the app on their mobile equipment which delivers an output such as a QR code (or other local communication such as NFC) containing two time-based codes. The login process on the computing device accepts the output and sends the time-based codes to the authentication apparatus, either together or the second code on request. The authentication apparatus now locates the codes and automatically resynchronises to any time zone across the world plus 1 hour of clock drift (+/− 13 hours UTC).

21 Claims, 4 Drawing Sheets

(56) References Cited

U.S. PATENT DOCUMENTS

| | | | |
|---|---|---|---|
| 2003/0018777 A1* | 1/2003 | Miller | G06Q 30/02 709/223 |
| 2003/0031466 A1* | 2/2003 | Su | G11B 19/122 386/248 |
| 2003/0105964 A1* | 6/2003 | Brainard | G06Q 20/32 713/178 |
| 2006/0136739 A1 | 6/2006 | Brock et al. | |
| 2006/0160524 A1* | 7/2006 | Borella | H04L 12/2856 455/411 |
| 2007/0050635 A1* | 3/2007 | Popp | H04L 9/0863 713/185 |
| 2007/0220253 A1* | 9/2007 | Law | H04L 63/0838 713/168 |
| 2008/0168544 A1* | 7/2008 | von Krogh | G06F 21/34 726/6 |
| 2010/0100724 A1* | 4/2010 | Kaliski, Jr. | H04L 9/3013 713/155 |
| 2012/0210408 A1* | 8/2012 | Lu | H04L 63/0846 726/6 |

OTHER PUBLICATIONS

Franck Adkhis; Partial European Search Report; Application No. EP13199417; Mar. 27, 2014; European Patent Office; Munich, Germany.

Starnberger G. et al.; "QR-TAN: Secure Mobile Transaction Authentication", Mar. 16, 2009; 2009 International Conference on Availability, Reliability and Security; pp. 578-583; XP031469253A; New Jersey, USA.

* cited by examiner

TIME-BASED AUTHENTICATION

FIELD OF THE INVENTION

The present invention relates to time-based authentication apparatus. It finds particular application in two factor authentication.

BACKGROUND OF THE INVENTION

In industry, "two factor authentication" is a widely used term which describes a way of strongly authenticating a user trying to logon. There are three ways to identify a person: something they know such as a password; something they own such as a credit card; or something they are, such as a fingerprint. Two factor authentication simply means bringing two of these factors together and is interpreted largely as something you know (such as a password) and something you own (such as a token, phone or credit card).

Various attempts at using a mobile phone as a factor in authentication have been made by on-line banking portals and manufacturers of two factor authentication equipment, these all following a similar technique as follows:

The user logs on to a computer application by first entering their user identity ("UserID") and a personal identification number ("PIN"), these being something they know. If these credentials are correct, a one-time passcode (typically six digits) is then sent from an authentication server as a text message to the user's mobile phone, this being something they own. The user enters this passcode, proving they possess the phone. After this passcode has been used it is locked, that is rendered unusable as a passcode for this user, to prevent any hackers or un-authorised person from trying to replay the already used passcode. For example, an indicator such as a "locked" flag might be set against the individual passcode at the authentication server.

Such a technique is relatively slow because the user has to enter three different pieces of information. Further, it has the serious drawback that it assumes that the passcode text message to the mobile phone can be sent in a quick and reliable fashion. It does not take into account the following three issues: text message delivery delays; signal dead spots; and conflict arising where a mobile device itself is used to connect to the Internet. Conflict can arise because a mobile device having a data connection established for authentication cannot receive text messages at the same time.

These problems arising in sending passcodes as the user logs on present serious reliability issues, particularly when scaled to higher numbers of users as the chances of incurring a text delivery delay or intermittent signal loss become higher.

In a known arrangement, a security code generator can instead be installed on the user equipment. This can generate a time-varying security code which the user can input to remote authentication apparatus in an authentication process. For example, originating with a seed record, the security code generator takes the current time and applies a hash function using a secret key to generate a multi-digit code which the user inputs. The creation of appropriate time-synchronised, one-time codes from a seed record is described in the "Request for Comments" RFC6238 published in May 2011 by the Internet Engineering Task Force (IETF) at: http://tools.ietf.org/html/rfc6238.

However, such techniques require co-ordination with the remote authentication apparatus. That co-ordination can be lost for various reasons, for example because times can drift on the user equipment or because the user adjusts the clock time.

It is known for the remote authentication apparatus to accommodate a degree of time slip between the user equipment and the authentication apparatus. Each code is usually relevant for a short period of time, for instance 30 or 60 seconds. The authentication apparatus might allow for a degree of time slip by accepting a code which would be generated by the user equipment just before or just after the correct time slot. However, this does not accommodate wide discrepancies. Discrepancies of several hours can arise for example because the user has travelled between time zones and then changed the clock on their user equipment.

SUMMARY OF THE INVENTION

According to a first aspect of embodiments of the present invention, there is provided portable electronic equipment for use with time-based authentication apparatus, the portable electronic equipment comprising:
  i) a seed record;
  ii) a time-based code generator for generating codes from the seed record, each code being associated with a respective time slot; and
  iii) an output assembler configured to output a composite code comprising at least two different time-based codes, each time-based code being associated with a different respective time slot.

Portable electronic equipment in this context is intended to mean portable apparatus which can store a seed record and generate and output time-based codes from the seed record. It might be a mobile telephone, tablet or other communications device with storage and processing capacity, or it might be a card reader with no network capability.

A seed record can be deployed to portable electronic equipment which has been prepared by loading a software application onto it. Such loading of a software application can be done for example by downloading an "app" from an online app store. The app provides the code generator and output assembler. The portable electronic equipment is then enabled to output a composite code for use, via an access device, in authentication.

It is known to display a human-readable code for a user to read from the display of portable electronic equipment and then enter via an access device, such as a six or eight digit number. For instance, the user might use a card reader to generate a six digit code which they then enter manually to their computer browser. However, the output assembler might preferably be adapted to output the composite code in a machine-readable format. For instance it might be digitised and displayed on a screen and then machine-read by use of a detector or camera such as the widely available web cam commonly provided with computers. A suitable graphic format is the QR code (quick response code), a two-dimensional array of binary elements which can also be detected via the camera of Internet-enabled devices such as smartphones or tablets. The user can then deliver the composite code to the access device simply by putting the screen of their portable electronic equipment (eg phone or card reader) in front of the web cam of the access device. Alternatively, the composite code can be delivered to the access device by any of several other known forms of inter-machine, local communication channel. Suitable formats are:
  near field communications (NFC) codes based on the magnetic coils used in many known swipe cards
  wireless communication conformant to Bluetooth® standard(s)
  WiFi
  a universal serial bus (USB®) cable
  a set of encoded sound tones delivering the composite code to a microphone of the access device.

Local in this context is intended to indicate a direct inter-machine connection, excluding long-distance networked connections such as the Internet.

Each time-based code in a composite code might be of known format, such as a six or eight digit code. Hence the composite code might comprise a twelve or sixteen digit code, or greater. The use of two or more time-based codes provides strong authentication while remaining simple for the user if the composite code is delivered by an inter-machine, local communication channel such as a QR code or NFC. The user does not then have to read or manually enter the composite code.

Embodiments of the invention in its first aspect provide equipment which offers automatic resync in a time-based, strong authentication system, even where there has been a major time slip such as several hours.

According to a second aspect of embodiments of the present invention, there is provided time-based authentication apparatus for use with portable electronic equipment according to the first aspect, the authentication apparatus comprising:

a) a profile store updater for creating and updating a stored set of data profiles, each data profile including a seed record from which time-based security codes can be generated, and user identification data;

b) seed record deployment apparatus for deploying a seed record for access via portable electronic equipment and to a data profile; and c) a code authenticator for receiving and authenticating time-based codes on the basis of a deployed seed record, wherein the code authenticator is adapted to receive two or more different time-based codes in respect of the same authentication instance, each code being associated with a different respective time slot.

The user identification data (userID) might comprise a user name and password or personal identification number (PIN).

In an embodiment of the invention, the code authenticator might receive a first time-based code which it is configured to authenticate on the basis of a deployed seed record in known manner. For example, it might generate the time-based code relevant to the current time slot, or a series of codes relevant to the current time slot and a small number of time slots before and after it, from the seed record, and compare the first time-based code with the generated code(s). However, if authentication fails with respect to this first time-based code, the code authenticator does not terminate the authentication instance. Instead, it may initiate a different authentication mode. In this different mode, it uses first and second received time-based codes, the code authenticator now generating a substantially larger number of time-based codes relevant to a much longer range of time slots and searching for both received time-based codes against these.

In use of embodiments of the invention in both its first and second aspects, the code authenticator may receive at least two different time-based codes by means of a composite code output by the portable electronic equipment.

It would be possible for the code authenticator always to receive all of the two or more different time-based codes and to use the different authentication mode as the only authentication mode. However, this could mean a large amount of data processing for every authentication instance because the substantially larger number of time-based codes would have to be generated and searched every time. It is preferable that the code authenticator has a two stage process using two different authentication modes for the first and second time-based codes as described above.

The code authenticator might always receive both or all of the time-based codes for each authentication instance but only attempt to authenticate one of them in a first authentication mode, against the small number of time slots, before going into the different authentication mode if the first mode fails. Alternatively, the code authenticator might be configured to receive a first time-based code for use in the first authentication mode, and to request the second or further time-based codes only if the first mode fails.

An "authentication instance" is intended in this context to mean the running of an authentication process from initiation by a user or other entity through to termination, usually on success or final rejection.

An embodiment of the invention could have great advantage in the following scenario.

Traveling business executives demand a 99.9% reliable authentication system so they can connect back to the office, using an access device such as a laptop computer or tablet, to receive email and other corporate data. They need to enter a time-based code generated by their mobile equipment, such as their phone. However, if they fly to a different country they typically need to change the clock on their mobile phone to the new time zone. Non-technical people may change the actual time instead of the time zone which would cause a time sync error that would cause known forms of time-based authentication to fail. The user might then require a helpdesk phone call or online communication to put matters right. Automatic clock synchronization available on some mobile equipment still requires a wireless connection to operate which may not be possible as roaming costs when overseas are very high and typically disabled or the user may simply be out of range of a mobile signal.

An embodiment of the invention could simply deal with the time sync error whatever the time zone. For instance, for those users travelling in Europe, this might be of the order of +/−five hours. Indeed, the code authenticator can offer automatic resync to any time zone the mobile equipment is operating to (+/−13 hours) without the mobile equipment having any data connection or signal.

The two or more different time-based codes might be relevant to consecutive time slots, such as a current time slot and a previous or subsequent one. Using two or more codes increases the strength of the authentication process, since the number of digits in the codes received is doubled or more, and increases the information received as to any time drift or resetting that has occurred at the mobile equipment. However, a fixed or varying number of time slots in the separation between the two or more different time-based codes could add a further level of security.

When a time-based code is received, the code authenticator needs to search for the code in relation to a data profile containing or referring to the correct seed record. In order to do that, it is necessary to identify the data profile, such as by reference to a user name and/or personal identification number (PIN). A user or process might optionally enter these during authentication but it is particularly convenient if the composite code also comprises a profile identity, such as a user name and/or PIN. In this case, the user might for example just show the QR code on the display of their mobile equipment to a webcam or other detector or camera, thus delivering not just two or more time-based codes but also a user name and/or PIN in just one step. In the NFC case, this would be a single swipe over a reader.

Embodiments of the invention provide strong authentication since a hacker would need to obtain the user name and PIN or password, and then guess a correct time-based code. If authentication in the first mode fails, the hacker is faced with guessing two time-based codes instead of one, albeit from a wider range of time slots.

According to a third aspect of embodiments of the present invention, there is provided a method of authenticating an entity, the method comprising the steps of:
  a) receiving at authentication apparatus at least two different time-based codes from an access device, each code being associated with a different respective time slot; and
  b) the authentication apparatus searching a set of time-based codes, the set being valid with respect to consecutive time slots together covering a period of time, for time-based codes matching the at least two different time-based codes.

The at least two different time-based codes may be valid with respect to consecutive time slots. However, it would be an option that they are valid with respect to non-consecutive time slots.

The method may further comprise the steps of:
  c) receiving at the authentication apparatus a first time-based code;
  d) the authentication apparatus searching a set of time-based codes valid with respect to consecutive time slots together covering a period of time for a time-based code matching said first time-based code; and
  e) failing to find said matching time-based code,
  wherein steps c) to e) precede step b).

The first time-based code is optionally one of the at least two different time-based codes. The two different time-based codes may be received together, at step c), or separately. For example, after step e), the authentication apparatus may request a second time-based code, or two different time-based codes, from the access device.

Preferably the period of time of step b) is greater than the period of time of step d). This means that a quick authentication process is available if the first time-based code is present in the set of codes at step d).

According to a fourth aspect of embodiments of the present invention, there is provided a method of generating time-based codes from a seed record, which method comprises the steps of:
  i) generating two or more different codes from the seed record, each code being valid with respect to a different respective time slot; and
  ii) constructing a composite code comprising said two or more different time-based codes.

Step ii) might further comprise outputting the composite code in the form of a QR code or as content to be sent by other inter-machine local communication channel. Methods according to this fourth aspect of the invention might be carried out by portable electronic equipment which has received the seed record by means of a local inter-machine communication channel such as a scannable QR code.

It is to be understood that any feature described in relation to any one aspect or to any one embodiment of the invention may be used alone, or in combination with other features described, in relation to the same or one or more other aspects or embodiments of the invention if appropriate.

BRIEF DESCRIPTION OF THE DRAWINGS

Authentication apparatus according to an embodiment of the invention will now be described, with reference to the accompanying figures in which.

DETAILED DESCRIPTION OF THE INVENTION

Figure 1A:
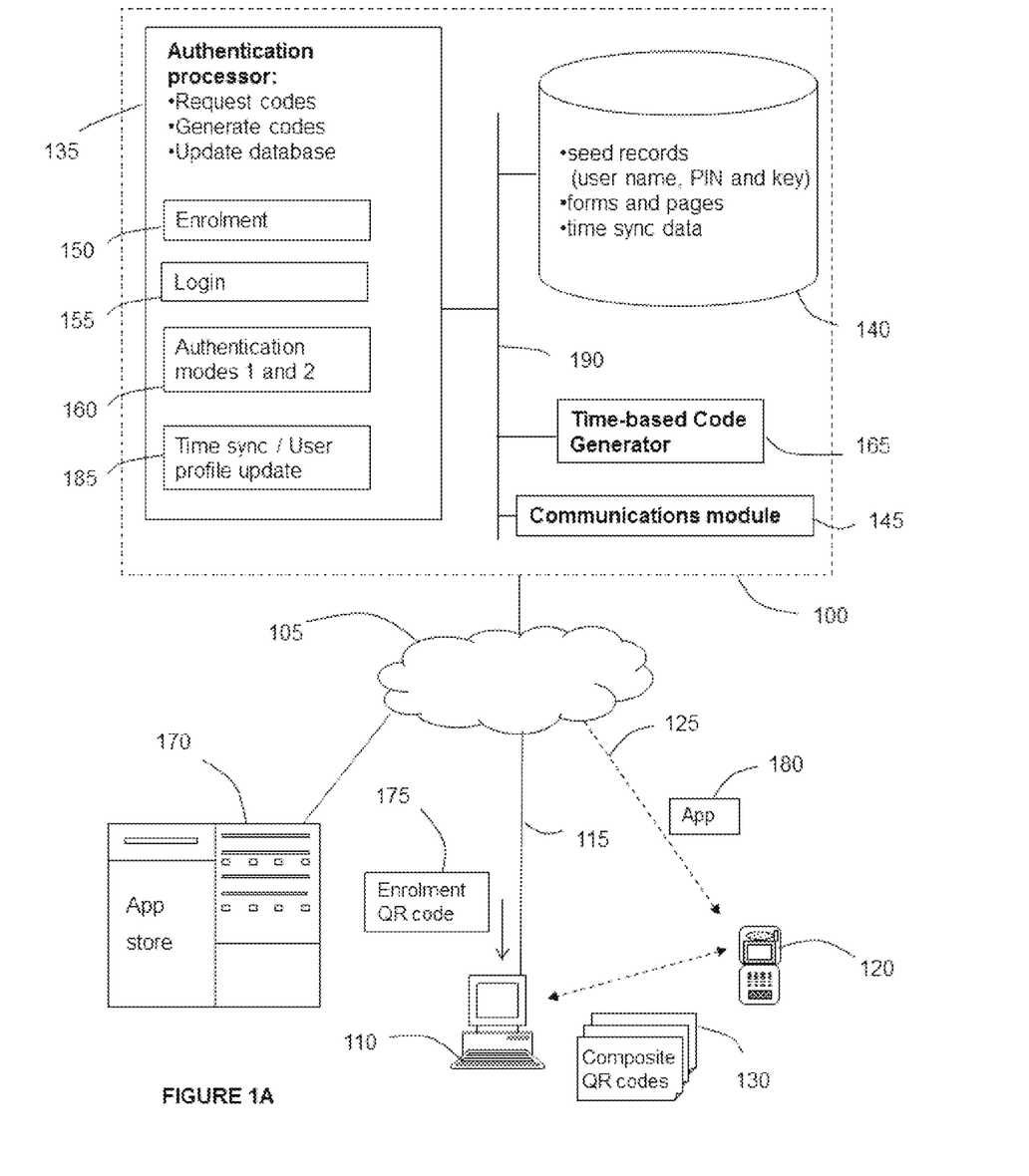
FIG. 1A shows a functional block diagram of the authentication apparatus connected to a public communications network.

Referring to FIG. 1A, the authentication apparatus is supported by a server 100 connected in known manner via an external interface or interfaces 145 to a public communication system 105 such as the Internet and/or mobile telephony channels 125. This enables communication with a user's access device, such as computer equipment 110 by Internet protocol over data links 115. The authentication server 100 supports an authentication processor 135 together with a user profile database 140 which stores authentication data in relation to a set of enrolled users. Components supported by the authentication server 100 are connected for internal communication via an internal network such as a local area network ("LAN") 190.

Figure 1B:
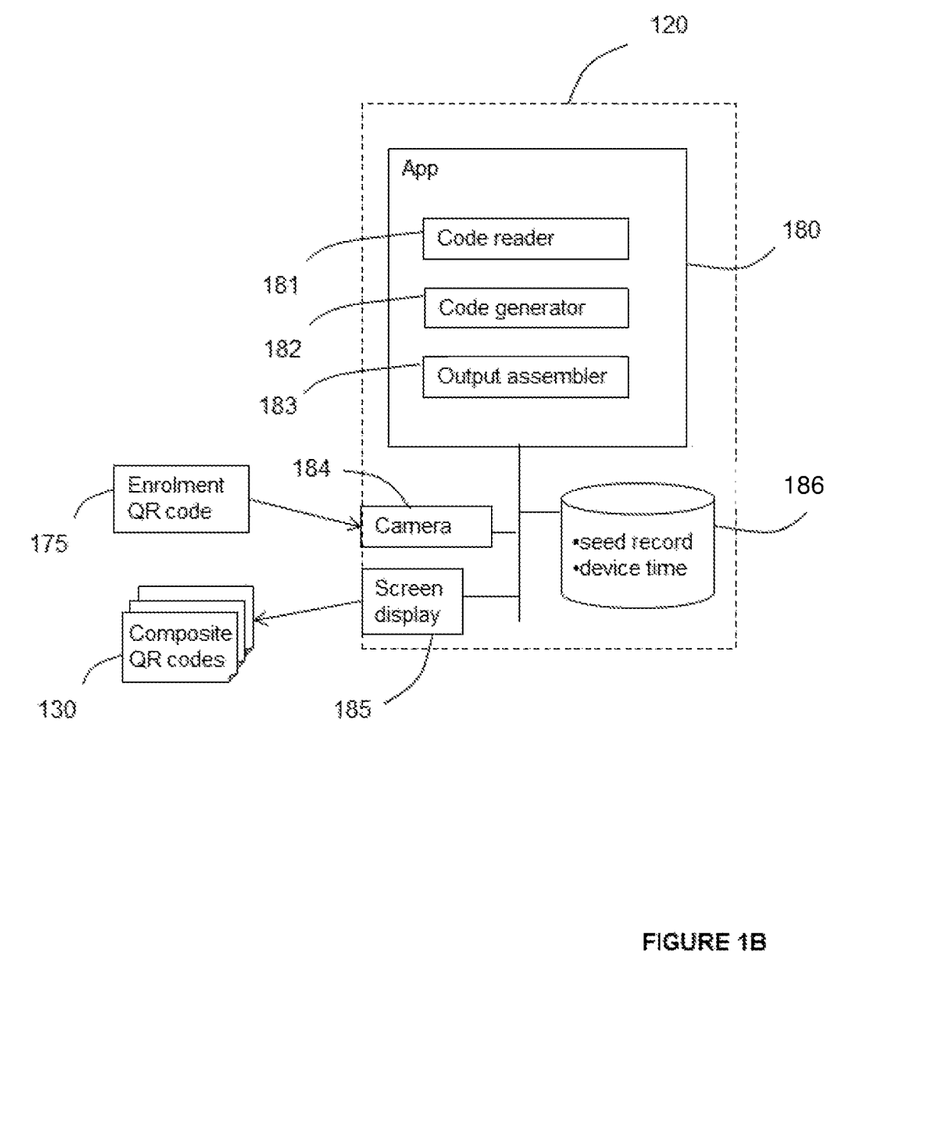
FIG. 1B shows a functional block diagram of app components installed in a portable electronic device shown in FIG. 1A.

The authentication processor 135 has several processes available for it to run, providing the following components:
  an enrolment process 150 for enrolling new users, this providing seed record deployment apparatus
  a login process 155 for enrolled users to access
  a code authenticator 160 having two different authentication modes which can be triggered during login, according to real-time circumstances
  a profile store updater 185, providing time synchronisation and user profile updates which can be done at the end of a login process Referring to FIG. 1B, in general in the embodiment(s) described below, the user requires a portable electronic device 120 such as a smartphone which can carry a software application 180 (app) and has an input 184 and an output 185, each supporting an inter-machine, local communication channel such as a camera for scanning a QR code and a screen for displaying one. The app 180 has a code reader 181, a code generator 182 and an output assembler 183. It also has read and write access to data storage 186 provided by the device 120. It can therefore receive an incoming code, such as an enrolment QR code, extract a seed record, store the seed record and read the device time. After enrolment, it can generate a composite time-based code, using the code generator 182 and the current and additional device times, and use the output assembler 183 to put it into a form to go via the output 185, such as a QR code or a NFC message.

Referring to both of FIGS. 1A and 1B, an outline of the functioning of the authentication processor 135 in relation to a user accessing a secure application or database is as follows.

Enrolment

To enrol, a user downloads a software application. This might be of known type commonly referred to as an "app" 180 which can be downloaded by data connection over the Internet 105 from an app store 170 onto the portable device 120. The user must also be represented in the user profile database 140 by a user name and password or personal identification number (PIN) and these must therefore be entered by the user or on their behalf. This can be done by conventional means such as email or other Internet communication with the enrolment process 150 of the authentication processor 135. Once represented in the user profile database 140, to complete enrolment the user accesses a website offered by the authentication processor 135 via an Internet-capable device 110, such as a computer, tablet or smartphone, enters the user name and PIN and obtains an enrolment QR code 175 which is displayed on the Internet-capable device 110. The enrolment QR code 175 contains the user's user name, a PIN and a key, these providing a seed record. The user scans this enrolment QR code 175 with the camera 184 of their portable device 120 and the app 180 runs the code reader 181 to obtain the seed record from the enrolment QR code, in known manner. The app 180 stores the seed record in the data storage 186 of the portable device 120. Subsequently, the app 180 can run its time-based code generator 182 to generate time-based passcodes in synchronism with the authentication processor 135, or with a time offset stored by the authentication processor 135. The output assembler 183 can put these into a format for output via the portable device output 185, such as a QR code or NFC message.

Authentication

Once enrolled, the user can be authenticated by the authentication processor 135 via an access device 110, for instance from a laptop or other computer equipment. To do this, the user uses the access device 110 to trigger the login process 155 via the internet. The login process 155 delivers to the access device 110 a page which has embedded in it software including a command that activates a QR code scan process using the laptop's built-in web cam to scan and interpret QR codes. This embedded software is run when the user clicks on a button or menu choice with a relevant name such as "OneScan". The user also, independently, starts the app 180 on their portable device 120.

The app 180 asks the user for their PIN and retrieves the user name from stored data received in the enrolment QR code 175. The app 180 starts to create a one-time login QR code 130 every thirty seconds. Each login QR code 130 has the following data embedded in it:
  user name
  PIN or password
  a current one-time code and a next consecutive one-time code, generated from the seed record and current time The app 180 now displays a current login QR code 130 on the screen 185 of the portable device 120. The user clicks on the OneScan button on the screen display of the laptop 110 and presents the current login QR code 130 to the webcam on the laptop 110 which scans it. The software embedded in the login page extracts the content of the QR code, this being user name, PIN and two one-time codes, fills in a login form and submits it to the authentication processor 135. This delivery of data to the authentication processor 135 however contains only a first of the one-time codes.

Alternatively, the PIN entered by the user can be checked by the app 180. It should match the one it received in the enrolment QR code 175. Only if the PIN is correct does the app start to create the QR codes 175.

On receipt of the login form, the authentication processor 135 starts to run a first of the authentication modes 160, generating one-time codes across an interval of +/−5 minutes of the current time at the server 100 and searching for a single one-time code to match the code supplied by the login form. If it is found, the user is authenticated and access is granted. The finding of the code in this first mode indicates that the time at the portable device 120 is synchronised to the time at the authentication server 100 within five minutes and the code gives the perceived time at the portable device 120 within a 30 second time slot. The authentication processor 135 will run the time sync process 185 to update the user profile in the database 140 as necessary.

If the single one-time code is not found, the authentication processor 135 requests a second one-time code from the login QR code 130. The embedded software in the login page complies and the authentication processor 135 starts to run a second of the authentication modes 160, generating one-time codes across an interval of +/−13 hours of the coordinated universal time (UTC) and searching for both one-time codes supplied by the software embedded in the login page. If they are found, the user is authenticated and access is granted. The finding of the two codes in this second mode could indicate that the time at the portable device 120 is only synchronised to the time at the authentication server 100 within several hours. However, again the codes give the perceived time at the portable device 120 within a 30 second time slot and the authentication processor 135 is now enabled, by use of the time sync process 185, to update the user profile in the database 140 automatically so as to adjust for a wide discrepancy in time between the server 100 and the portable device 120. This means that the next login attempt by the user is likely to require only the first of the authentication modes 160 to be used and only a single one-time code to be searched.

Figure 2:
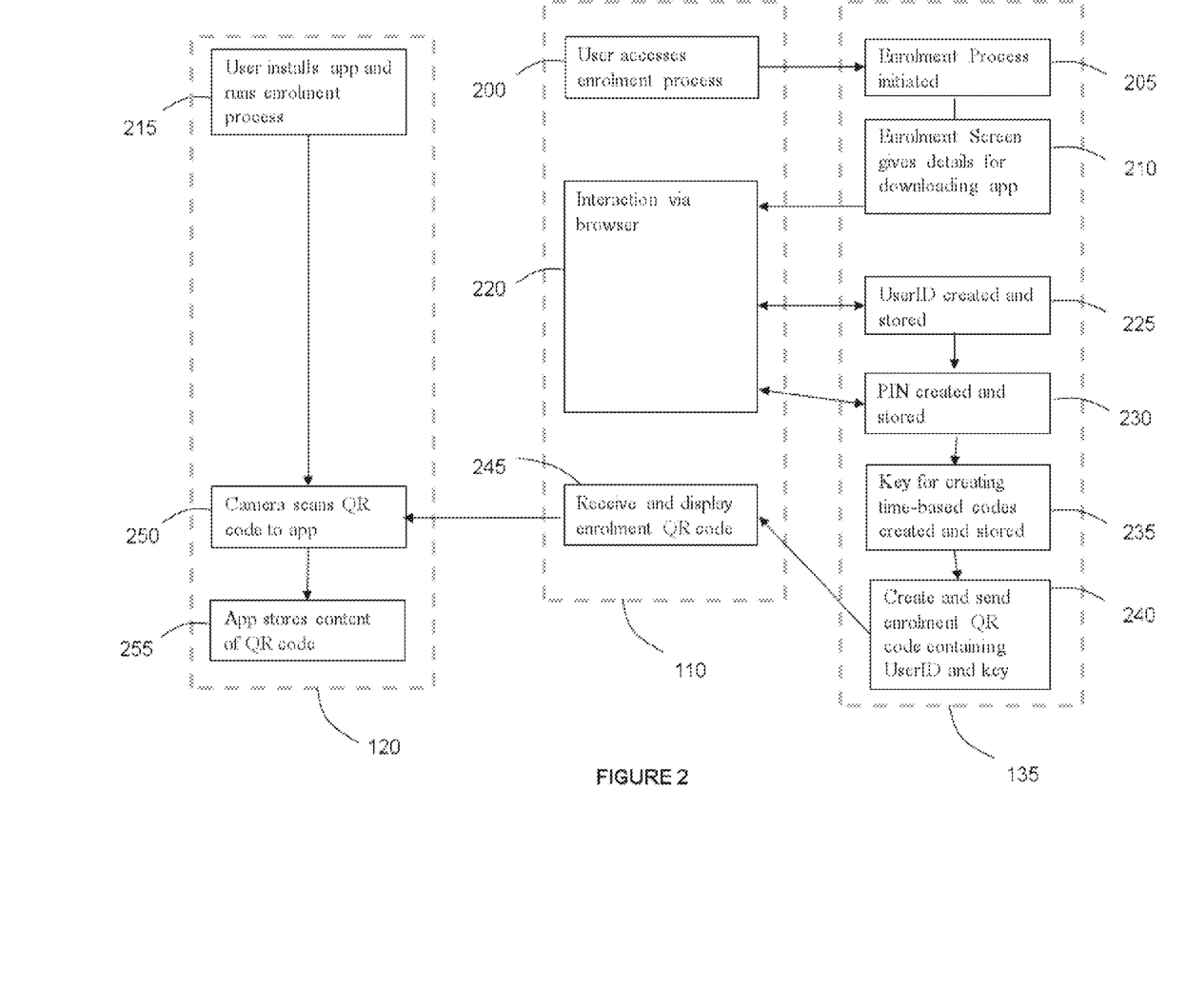
FIG. 2 shows a flow chart of a configuration process for enrolling a new user.

Referring to FIG. 2, the enrolment process 150 is now described in more detail.

STEPS 200, 205: The user directs a browser on an Internet-capable device 110 such as a laptop to initiate the enrolment process 150 of the authentication processor 135.

STEP 210: The enrolment screen gives details on how to download the required app to the mobile device 120.

STEP 215: The user downloads and installs the app.

STEPS 220, 225, 230: Interaction between the user and the enrolment process 150 establishes a UserID and a PIN or password which the enrolment process 150 uses in creating a user profile in a user profile store on the database 140.

STEP 235: The enrolment process 150 assigns a key for use in creating time-based codes to the user profile.

STEPS 240, 245: The enrolment process 150 creates a QR code containing the UserID and key and sends it to the browser of the laptop 110 which displays it.

STEPS 250, 255: With the app running on their mobile equipment 120, the user directs its camera to scan the QR code displayed by the browser. The app extracts and stores the content.

Figure 3:
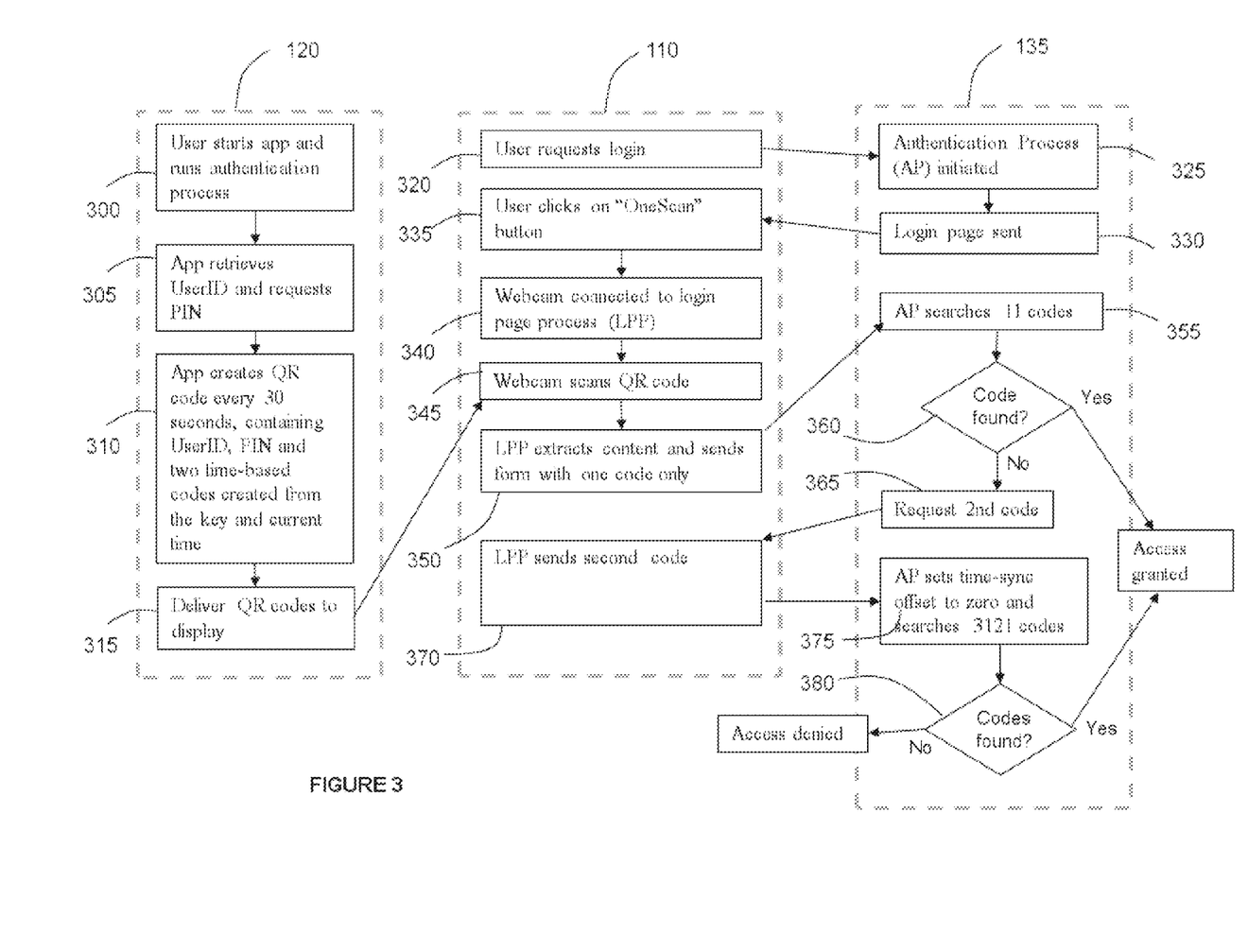
FIG. 3 shows a flow chart of an authentication process in use by a user.

Referring to FIG. 3, the login process 155 is now described in more detail.

STEPS 300, 305: Using their mobile equipment 120, the user starts the app and requests authentication. The app requests the PIN and retrieves the UserID from storage on the mobile equipment 120.

STEPS 310, 315: The app starts to create and display a QR code every 30 seconds, this containing the UserID, PIN and two time-based codes created by use of the key in relation to the current time slot according to the mobile equipment 120 and to the next consecutive time slot.

STEPS 320, 325, 330: Using their laptop 110, the user directs the browser to the authentication processor 135 and requests login. The authentication processor 135 starts the login process 155 and sends a login page to the browser. This login page includes a "OneScan" button or menu choice.

STEPS 335, 340, 345: The user selects the OneScan button, which links the output of the laptop's webcam to the login process 155, and directs the webcam to the QR code currently displayed as a result of step 315 on their mobile equipment 120.

STEP 350: The login process 155, present at the browser on the laptop 110 by means of the login page, extracts the content of the QR code and sends a form containing the UserID, PIN and just a first of the time-based codes to the process running at the authentication processor 135.

STEP 355: On receipt of the user name and PIN (or password), the login process 155 at the authentication processor 135 looks up the user name and checks the PIN or password is correct. There may already be a stored time sync offset for the user. The login process 155 then retrieves the seed record for the given user name and generates eleven one-time codes, these covering the period +/−five minutes in 30 second steps from the current time, taking into account any stored time sync offset.

STEP 360: Access is granted if the incoming one-time code matches one of these eleven. The code is then locked and cannot be reused.

STEPS 365, 370: If no match is made the login process 155 requests the second time-based code from the laptop 110. (Optionally, the second required code could have been appended to the first one in the form at step 350.)

STEP 375: The login process 155 at the authentication processor 135 now sets the user's time sync offset to zero (UTC time), generates and searches 3121 codes, these covering the period +/−13 hours (+/−12 hours of UTC—coordinated universal time—for traveling users who may change their phone's time, and also allows for up to one hour for any clock drift). This search is still in respect of the first of the time-based codes only. Only if a match is found does the login process 155 use the second time-based code and this is to check that the second time-based code is the correct next consecutive code.

STEP 380: Access is granted if the two codes are found consecutively in the 3121 codes. The login process 155 will also update the time offset stored in this user's profile. The first and second one-time codes are then locked and cannot be reused.

In an alternative arrangement, the mobile equipment does not request the PIN and the login QR code 130 only contains:
User name
Two consecutive one-time codes generated from the seed record and current time In this arrangement, the user may have entered their PIN or password during the login process via the laptop 110 or the mobile equipment 120 so that it is always verified, but the rest of the process remains the same.

If more than ten incorrect authentication attempts are received after the last successful one, the authentication processor 135 will disable the user's account.

It is not essential that the first and second one-time codes are associated with consecutive time slots but it could become complicated in terms of locking both time codes if they are associated with widely separated time slots.

What is claimed is:

1. Authentication equipment, the equipment comprising portable electronic equipment and time-based authentication apparatus, the portable electronic equipment comprising:
   i) an input and an output;
   ii) a data storage for receiving and storing a seed record deployed by a seed record deployment apparatus;
   iii) a time-based code generator for generating time-based codes from a received seed record, each code being valid with respect to a respective time slot; and
   iv) an output assembler configured to output a composite code comprising two or more different ones of said time-based codes, each one of the two or more different time-based codes being valid with respect to a different respective time slot; and the time-based authentication apparatus comprising:
   a) a profile store updater for creating and updating a stored set of data profiles, each data profile including the seed record from which time-based security codes can be generated using a current time at the authentication apparatus, and user identification data;
   b) the seed record deployment apparatus for deploying a seed record for access via the portable electronic equipment and to one of the data profiles; and
   c) a code authenticator for receiving and authenticating time-based codes on the basis of a deployed seed record, wherein the code authenticator is adapted to receive two or more different time-based codes in respect of the same authentication instance, each received time-based code being valid with respect to a different respective time slot; and
   wherein the code authenticator is configured to generate a set of time-based codes based on the current time at the code authenticator and to match said two or more different received time-based codes to said set of generated time-based codes.

2. Equipment according to claim 1 wherein the output assembler is configured to output the composite code as a graphic screen display.

3. Equipment according to claim 2 wherein the graphic screen display comprises a QR code.

4. Equipment according to claim 1 wherein the portable electronic equipment is configured to provide an inter-machine local communication channel and the output assembler is configured to output the composite code as content for that communication channel.

5. Equipment according to claim 4 wherein the inter-machine communication channel comprises at least one selected from the following: a near field communications channel; a wireless communication channel; a WiFi channel; a universal serial bus socket; and an audio channel for delivering a set of encoded sound tones.

6. Equipment according to claim 1 wherein each time-based code of a composite code comprises at least six digits.

7. Equipment according to claim 1, adapted for connection to a mobile communications network.

8. Apparatus according to claim 1 wherein the set of generated time-based codes is valid with respect to consecutive time slots together covering a period of time.

9. Apparatus according to claim 8 wherein the period of time is at least +/−five hours with respect to the current time for the code authenticator.

10. Apparatus according to claim 1 wherein said two or more different time-based codes are valid with respect to consecutive time slots.

11. Apparatus according to claim 1 wherein the code authenticator is configured to authenticate in two different modes, in a first mode to authenticate on the basis of a single time-based code and in a second mode to authenticate on the basis of at least two of said different time-based codes.

12. Apparatus according to claim 11 wherein the code authenticator is configured to operate in said first mode on receipt of at least one time-based code and to operate in said second mode on failure of authentication in said first mode.

13. Apparatus according to claim 11 wherein:
in the first mode the code authenticator is configured to match the single time-based code to codes in a set which are valid with respect to consecutive time slots together covering a first period of time; and in the second mode the code authenticator is configured to match the at least two time-based codes to codes in a set which are valid with respect to consecutive time slots together covering a second period of time, the second period being longer than the first period.

14. Apparatus according to claim 8 wherein the period of time is at least +/−thirteen hours with respect to a current time for the code authenticator.

15. Equipment according to claim 1 wherein one of the two or more different time-based codes is valid with respect to a current time slot of the portable electronic equipment.

16. A method of authenticating an entity on the basis of a seed record for that entity, the method comprising the steps of:
   a) receiving at least two different time-based codes at authentication apparatus, each code relating to the same seed record but being associated with a different respective time slot in relation to a current time at the authentication apparatus;
   b) the authentication apparatus generating a set of time-based codes relating to the seed record and using the current time at the authentication apparatus;
   c) the authentication apparatus searching the set of generated time-based codes for the received time-based codes, the set being valid with respect to consecutive time slots together potentially covering a period of time for time-based codes matching the received time-based codes; and
   d) using portable equipment to generate time-based codes from a seed record by:
      i) generating two or more different codes from the seed record, each code being valid with respect to a different respective time slot, using the current time at the portable equipment; and
      ii) constructing a composite code comprising said two or more different time-based codes.

17. A method according to claim 16, further comprising, prior to step c), the following step of:
   e) after receiving a first of said two different time-based codes, the authentication apparatus searching the generated set of time-based codes valid with respect to consecutive time slots together covering a period of time for a time-based code matching said first time-based code, and failing to find said matching time-based code.

18. A method according to claim 17 wherein the period of time of step c) is greater than the period of time of step e).

19. A method according to claim 18 wherein the period of step c) is +/−thirteen hours with respect to the current time at the authentication apparatus.

20. A method according to claim 16, further comprising the step of outputting the composite code in the form of a QR code or other content for transmission from the portable equipment by an inter-machine local communication channel.

21. A method according to claim 16 wherein the two or more different codes generated using the portable equipment are valid in relation to non-consecutive time slots.

* * * * *